Dec. 29, 1964

H. NEWMAN ETAL 3,163,039

INERTIAL NAVIGATOR PLATFORM

Filed Dec. 19, 1960

INVENTORS
HARRY NEWMAN
JOHN M. SLATER
BY
*Allan Rothenburg*
ATTORNEY

INVENTORS
HARRY NEWMAN
JOHN M. SLATER
BY *Allan Rothenberg*
ATTORNEY

United States Patent Office 3,163,039
Patented Dec. 29, 1964

3,163,039
INERTIAL NAVIGATOR PLATFORM
Harry Newman, Bellflower, and John M. Slater, Fullerton, Calif., assignors to North American Aviation, Inc.
Filed Dec. 19, 1960, Ser. No. 76,617
9 Claims. (Cl. 73—178)

This invention relates to inertial systems and particularly concerns arrangement and structure of a stable reference element together with a pivotal mounting therefor.

In conventional inertial systems the gyroscopes are assembled on a unitary device commonly designated as a stable element which is intended to retain either an angularly fixed (irrotational) relation to inertial space or, alternatively, to rotate in space in some predetermined manner such as, for example, in synchronism with earth rotation. The acceleration sensing devices are mounted on the stable element and therefore sense accelerations in a coordinate system fixedly related to the element. The stable element, the assemblage of gyroscopes and acceleration sensing devices, is mounted as a single unit in gimbals in order to enable it to retain its orientation in inertial space completely independently of vehicle maneuvers. The gimbal mounted stable element is commonly designated a stable platform.

In the conventional arrangement of a stable platform, relatively large diameter gimbal rings are mounted so as to circumscribe the stable element, the assemblage of inertial instruments. The principal advantage of such an arrangement is the provision of a substantial amount of freedom on each of three mutually orthogonal axes. However, the use of the conventional system entails such difficulties that there have been proposals for systems completely eliminating gimbal mounting, although a large and complex computer is thereby required.

The disadvantages of the conventional large external gimbal ring construction are many. With the instruments mounted within the gimbal rings electrical leads from electronic equipment, power supplies and the like which are mounted externally of the platform must be brought across three moving joints with the concomitant compromise of reliability and ease of fabrication. External gimbal rings may be as much as 20 inches in diameter whereby they are inherently flexible. Such flexibility of the large, thin gimbal ring creates difficult bearing problems since rigidity of the bearing assembly is a major requirement. Furthermore, the use of large gimbal rings with the inherent flexibility thereof compromises the accuracy of information which is transmitted from resolvers, "inductosyns," or the like, mounted on the gimbal axes.

Further disadvantages of the external gimbal ring configuration derive from the relatively large moment of inertia thereof. A considerable amount of torque is required to accelerate the gimbals. Gimbal inertial loads in some instances may predominate over bearing friction and other loads. This situation has required a four axis (redundant gimbal) construction for some exterior gimbal platforms. Further, such large moment of inertia has required the use of reduction gearing between the gimbal and the gimbal driving servo motors.

With an exterior gimbal construction the stable element itself is necessarily small and of low inertia which inherently decreases its stability. Because of the small size of the conventional stable element, the instruments carried thereby, gyros, accelerometers, and the like, must be made as small as possible and must be packed together as closely as possible. Such close packaging of inertial components makes for great difficulty in environmental controls, considerably increasing cooling problems, assembly, repair and inspection. Further, where design changes require the addition of other components to the stable elements, the premium upon space available upon the element itself will often necessitate a complete redesign of the platform.

Accordingly, it is an object of the present invention to avoid the above mentioned disadvantages and to attain new advantages in an improved stable platform.

Objects of this invention are achieved by employing a compact internal gimbal structure, in an arrangement which provides three mutually distinct axes, together with a stable shell which substantially encompasses the gimbal and the several inertial components mounted upon its exterior.

The disclosed embodiments of the present invention are intended primarily for use in submarines and surface vessels. However, they are capable of use in any type of vehicle from land vehicles to interplanetary craft. In carrying out the present invention in accordance with a preferred embodiment thereof, there is provided a rigid stable element of a shell-like configuration having a support portion and a wall portion extending from the support portion so as to define a cavity which is substantially encompassed by the wall portion. The element may be of substantially conical, cylindrical or hemispherical configuration. A three-axis gimbal is provided which secures the support portion of the stable element to a base with three degrees of angular freedom about the axes which are each distinctly defined by the gimbal so as to enable heading, roll and pitch information to be derived therefrom. The gimbal means includes a yoke adapted for connection to a supporting structure, an outer gimbal pivoted to the yoke, an inner gimbal pivoted to the outer gimbal and carrying a shaft on which the support portion of the element is rotatably mounted.

It is an object of this invention to provide an improved stable inertial reference platform of maximum simplicity and reliability.

It is another object of this invention to minimize problems related to the lead-in wires of a gimbaled system.

It is still another object of the invention to provide a stable platform mounted on gimbals of decreased inertia.

A further object of the invention is to provide a stable element of relatively increased inertia.

A further object of the invention is the provision of an inertial system which facilitates the use of direct drive gimbal servo motors.

Another object of the invention is to provide for ease of inspection and repair of components mounted upon a stable element.

Another object of the invention is the provision of an inertial navigation system wherein there is no requirement for close packing of the inertial components thereof.

Still another object of the invention is to provide a system to which elements can be added without complete redesign or with a minimum redesign of the platform structure.

Still another object of this invention is to provide a stable platform employing simple and massive shapes.

These and other objects of the invention will become apparent from the following description taken in connection with the accompanying drawings in which.

In the drawings like reference characters refer to like parts.

Figure 1:
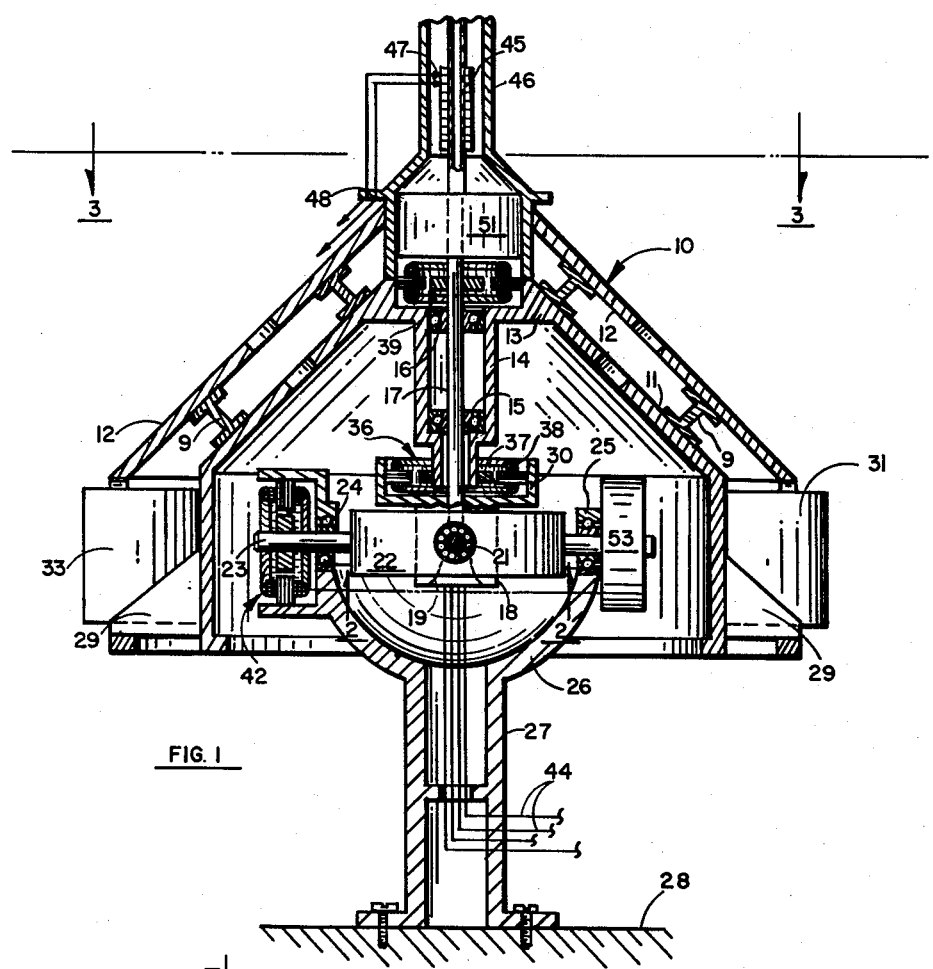
FIG. 1 is a sectional view of a stable platform constructed in accordance with the principles of this invention.

As illustrated in FIG. 1, a stable element 10 which, as previously discussed, is that part of the structure to be maintained in stabilized position about three axes in space, takes the form of a rigid assembly of inner and outer castings 11 and 12 joined by stiffeners 9 and each including a conical wall portion and a cylindrical wall portion integrally formed with and depending therefrom. The element 10 is of a shell configuration and may be formed in shapes other than that illustrated, such as hemispherical or cylindrical, or various combinations of such shapes which are so arranged as to provide a substantial cavity encompassed by the element wall portions for reception of the compact gimbaling system upon which the element is carried.

The element 10 includes an upper support portion 13 integrally formed therewith, together with an integral sleeve 14 which is journaled by means of bearings 15, 16 upon a hollow azimuth shaft 17. The azimuth shaft is fixedly mounted on a substantially cylindrical inner gimbal member 18 having an aperture 19 therein which is a continuation of the bore of shaft 17. The member 18 is supported by axle 21 for rotation about a pitch axis in an outer gimbal 22. Outer gimbal 22 is supported for rotation about a roll axis by means of an axle 23 and bearings 24, 25 in a yoke 26 which is integrally formed at one end of an upstanding pedestal 27 suitably secured to a base or other ship structure 28 either directly or through shock mounts (not shown).

Figure 3:
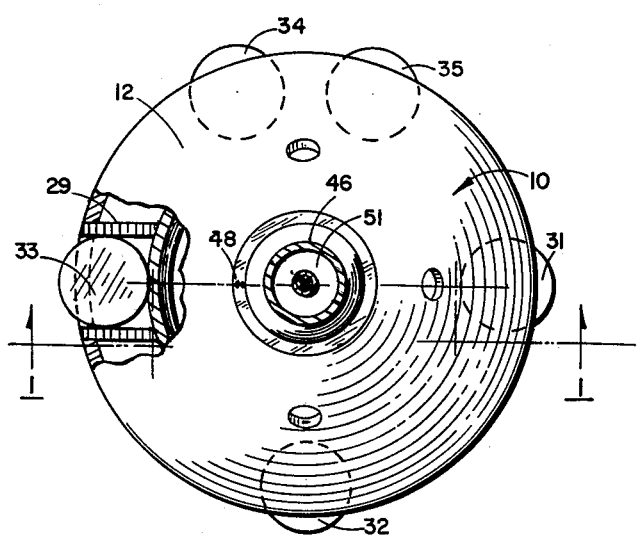
FIG. 3 is a top plan view schematically illustrating the arrangement of inertial components upon the stable element of FIG. 1.

The stable element fixedly carries on its exterior surface a set of gyros of any desired type. As illustrated, the exterior wall of the stable element is cut away and a number of shelves 29 are provided upon which the instruments are mounted for easy access. There can be provided two double-axis gyros or, as illustrated in FIGS. 1 and 3, three single-axis gyros 31, 32 and 33 disposed with their input axes (which are mutually orthogonal) in a conventional arrangement well known in the art. Other inertial instruments which may be carried on the exterior surface of the platform by any suitable rigid securing means include acceleration sensitive devices 34, 35. The several gyros control gimbal servo motors by means of electronic control amplifiers (not shown in FIG. 1) in a manner which is well known to those skilled in the art. Thus, there is provided a direct drive azimuth servo motor 36 including a rotor 37 fixed to a necked down portion at the free end of sleeve 14 and a stator 38 fixed to a housing 30 fixedly carried by inner gimbal 18. The azimuth gyro 32 which has its input axis parallel to the azimuth shaft directly controls the servo motor 36 by means of a servo controller (not shown in FIG. 1).

Figure 2:
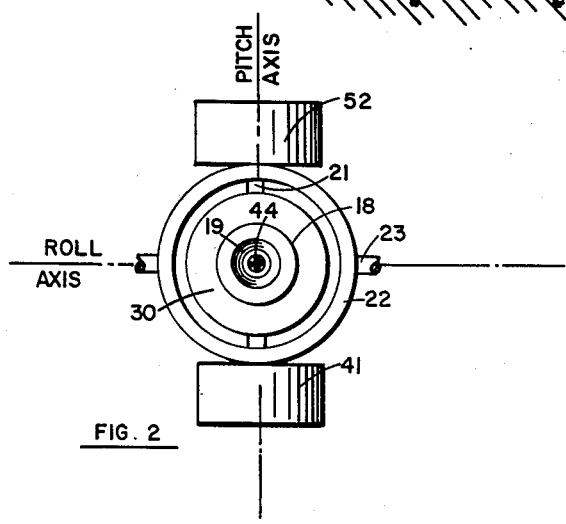
FIG. 2 is a sectional view of portions of the apparatus of FIG. 1.

There is provided a resolver 39 on the azimuth axis including a rotor fixed to azimuth shaft 17 and a stator fixed to the upper portion of the stable element 10 for the resolution of signals from the gyros 31 and 33 in a manner well known in the art. The signals from these gyros are fed to the resolver 39 and thence to the respective pitch and roll servo motors. A pitch servo motor 41 (FIG. 2) is provided having a stator mounted on the outer gimbal 22 and a rotor mounted on the axle 21. Of similar construction is the roll servo motor 42 having a stator carried by the yoke 26 and a rotor mounted on the axle 23 which forms the roll axis of the gimbal system.

A large number of electrical connections (which typically may be from 80 to 100 in number) must be made to the stable element for the purpose of supplying power and torquing signals and the like to the inertial instruments from power supplies, amplifiers and computers located externally of the platform and remotely thereof. In accordance with a feature of the invention, the electrical connections are made by means of leads 44 which extend through an aperture (not shown) in the pedestal 27 and extend upwardly through the hollow pedestal, through the conical bore 19 and member 18 and through the cylindrical bore in the hollow azimuth shaft 17. Leads (not shown) branch from the main group at bore 19 for connection with components mounted on the gimbals. The leads 44 are connected to the individual elements of a set of slip rings 45 carried by a portion of the shaft 17. Fixedly mounted on an upwardly extending portion of the stable element is a sleeve 46 carrying a number of brushes 47 of which one is provided for each slip ring although only two are illustrated. Each brush is connected by means of a terminal block 48 secured to the stable element to the appropriate component, gyro, accelerometer, or the like, mounted on and externally of the stable element shell. It may be noted that the enlarged lower portion of the bore 19 of member 18 permits flexing of the wires upon pitch and roll motion of the gimbals.

The pivotal axis of outer gimbal 22 is normally disposed along the longitudinal roll axis of a ship while the axis of shaft 21 will normally be disposed along the pitch axis. In operation the stable element is maintained level and in the meridian by appropriate control torques on the gyros as is well known in the art, whereby the angles registered at the gimbal axes define heading pitch and roll of the ship. These angles can be picked off by synchros illustrated as including an azimuth synchro 51, a pitch synchro 52, and a roll synchro 53. Equivalent devices such as "inductosyns" may also be used.

While complete azimuth freedom is obviously provided, the internal gimbal configuration does limit pitch and roll freedom. However, the proportions of the several structural members are so arranged as to allow in the neighborhood of ±45 degrees tilt about each of the roll and pitch axes of the stable element relative to the pedestal. It has been found that such an amount of limited freedom is adequate for marine applications and will be adequate for any other applications which do not involve violent maneuvering of the carrying vehicle.

Figure 4:
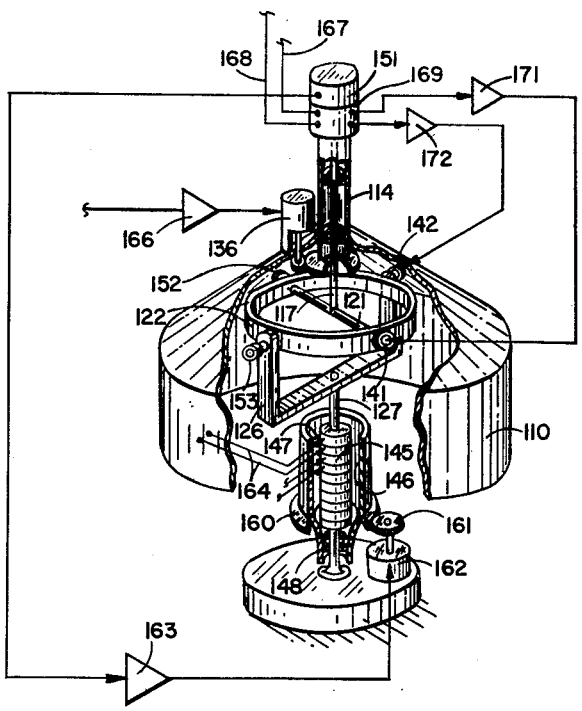
FIG. 4 is a simplified pictorial representation with parts broken away of a modified platform.

The arrangement illustrated in FIG. 1 is a most simple and efficient apparatus for connecting the numerous flexible leads to the stable element. However, in certain applications the drag provided by the friction of the azimuth slip rings with the brushes is undesirable. Illustrated in FIG. 4 is an arrangement which relieves the servo motor 36 from the load of slip ring friction. In the embodiment of FIG. 4 parts functionally similar to parts illustrated in FIG. 1 are designated by the same reference numerals with the addition of a prefix "1." Thus, the stable element shell 110 fixedly carries a sleeve 114 which is journaled for azimuth freedom on a shaft 117. Shaft 117 is fixed to an inner gimbal 121 which is journaled for rotation in pitch to an outer gimbal 122. The latter is mounted for roll freedom in a yoke 126 carried by a pedestal 127 adapted to be suitably secured to the supporting vehicle. In this arrangement there is provided a number of slip rings 145 directly affixed to the pedestal 127 for cooperation with brushes 147 which are carried on a sleeve 146 pivotally mounted as by bearings 148 on the pedestal 127.

The sleeve 146 carries a gear 160 meshing with a gear 161 which is driven by a follow-up servo motor 162 mounted on the base. Azimuth synchro 151 which provides a signal which is a measure of the angular deviation between the stable element and the azimuth shaft 117 provides an output fed through a servo controller 163 to drive servo motor 162 so as to rotate sleeve 146 and brushes 147 thereon in accordance with the rotation of the stable element 110 relative to the supporting vehicle. In this manner flexible leads 164 which connect the brushes 147 to the several components on the stable element may be kept fairly short and the azimuth servo motor 136 (illustrated as driving the stable element relative to its gimbaling by means of gearing in this embodiment) is relieved of the frictional loads of the slip rings.

Signals from the azimuth gyro, not shown in FIG. 4, are fed through servo controller 166 to servo motor 136. Signals from the roll and pitch gyros are fed via leads 167 and 168 to azimuth resolver 169 which then feeds signals via servo controllers 171 and 172 to the pitch and roll servo motors 141 and 142, respectively. Azimuth, pitch and roll synchros 151, 152 and 153 will provide angular data from the stable reference system. It is to be understood that suitable gyros and accelerometers, not shown in FIG. 4, will be mounted on the exterior of the stable element as described in connection with FIGS. 1 and 3.

It will be appreciated that the illustrated arrangements are adapted for most efficient use of the minimum floor space which is available upon a marine vehicle. While these systems have been illustrated and described as being mounted on and extending upwardly from a floor or deck of such a vehicle, it will be readily understood that in order to effect still further saving of floor space the entire assembly may be inverted and the system suspended from an overhead support.

The advantages of the described embodiments are numerous. The gimbals which define the three axes of freedom are extremely small and compact. Their moment of inertia is small, relieving the servo motors of the need for supplying large gimbal-accelerating torques. The compactness also makes possible a much more rigid bearing assembly than can be achieved with large flimsy rings and, moreover, a bearing assembly of remarkably low friction. In systems embodying the principles of this invention the measured friction torques are on the order of 100 gram-cm. per axis as compared with 1000 gram-cm. or more for conventional gimbals. One considerable advantage of the low friction, low inertia and decreased flexibility of the gimbals is that direct drive or ungeared servo motors (A.-C. or D.-C.) can be used. Absence of gearing provides for absence of backlash, friction and wear.

In a system embodying this invention the electrical connections to the inertial instruments are made in one jump from the pedestal to the stable element instead of having to be taken across three rotating gimbal axes as in conventional constructions. This provides for improvement in reliability and ease of fabrication and also ease in inspection. The latter feature is an important consideration in precision equipment. Further, synchro leads (not shown) do not have to be fed through the azimuth slip ring as in exterior gimbal arrangements, but may be taken across only one or two gimbal axes.

A significant feature of this platform configuration is that most of the really critical and delicate components are outside.

There is adequate room on the stable element for mounting not only the gyros and accelerometers but also practically anything else that one wants to. For example, preamplifiers and other electronic equipment may be mounted on the stable element to reduce the number of slip rings. There is also room for a star tracker and the star tracker is fully exposed, since the gimbals are all under it. Additional synchros and resolvers can be added to each axis.

Heat removal is easy, which is not always the case in a crowded cluster of instruments surrounded by gimbals.

The platform structure takes advantage of mounting conditions peculiar to ships. Ordinarily, floor space is at a premium whereas vertical extension is not. The situation is the converse from that in an airplane where a longitudinally elongated object sometimes may be better stowed than a vertical one. The platform of this invention can be elongated vertically without increasing its floor plan when such is necessary. For example, addition of a dozen slip rings in this platform merely changes its height, whereas in conventional constructions (with the gimbal ring outside the stable element) any increase in circuits directly increases the length of the platform. Furthermore, the platform can be inverted and bolted to some structural member above. This is the arrangement often used in practice. It obviously minimizes demands on floor space.

The described construction is particularly adapted for use with ceramic materials and the analogous "cermets," materials which have many advantages of porcelains and glasses (stability, rigidity, hardness, low expansion coefficient, and low density) and also possess some advantages of metals, such as machinability and lack of brittleness. In the present state of the art design of structures of these materials requires simple, massive shape. A conventional gimbal system with its large, thin rings would be difficult to fabricate with ceramics. However, the disclosed platform configuration is readily adaptable to a ceramic technology by virtue of its use of simple, massive, bulky configuration.

There have been described several configurations of a stable platform embodying a gimbal system of exceedingly small and compact arrangement which, nevertheless, provides three mutually distinct axes from which angular information can be derived as needed. The location of such a compact gimbal arrangement within the cavity or void provided by the stable element shell eliminates many disadvantages of conventional exterior gimbal systems including those connected with the problem of positioning lead-in wires, the problem caused by large, relatively thin gimbal rings, and the difficulties arising by reason of the close, dense packaging of components on the stable element. The described system is thus more rugged, more efficient, and simpler in design and in manufacture.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A stable platform comprising an elongated hollow support having a yoke at one end thereof and adapted to be secured to a base at the other end thereof, an outer gimbal member journaled in said yoke, an inner gimbal journaled in said outer gimbal, a hollow shaft fixed to said inner gimbal, a stable element journaled on said shaft, said stable element extending about and substantially enclosing said shaft and gimbals, a number of inertial instruments mounted on said stable element externally thereof, a number of lead-in wires extending through said hollow shaft and support, and means for connecting said wires to said instruments.

2. A stable platform comprising an elongated support having a yoke at one end thereof and adapted to be secured to a base at the other end thereof, an outer gimbal member journaled in said yoke, an inner gimbal journaled in said outer gimbal, a shaft fixed to said inner gimbal, a stable element of substantially conical shell configuration journaled on said shaft, said stable element extending about and substantially enclosing said shaft and gimbals, and a number of inertial instruments mounted on said stable element.

3. A stable platform comprising a support shaft having a yoke formed at one end thereof and adapted to be secured to a base at the other end thereof, an outer gimbal ring journaled in said yoke for rotation about a first substantially horizontal axis, an inner gimbal journaled in said outer gimbal for rotation about a second substantially horizontal axis, an azimuth shaft fixed to said inner gimbal, a sleeve concentric with and journaled on said azimuth shaft, said sleeve extending from said inner gimbal, a stable element of substantially inverted bowl shape, said element including a support portion rigidly secured to an upper portion of said sleeve and a downwardly and outwardly extending side wall portion substantially encompassing said yoke, gimbals, azimuth shaft, and sleeve, an azimuth motor having a stator on said inner gimbal and a rotor on said sleeve for driving said element relative to said azimuth shaft, an azimuth pickoff device on said element for sensing azimuth motion of said element relative to said azimuth shaft, a second servo motor on said outer gimbal for driving said inner gimbal relative to said outer gimbal about said second axis, a second pickoff device on said outer gimbal for sensing relative motion of said gimbals about said second axis, a third servo motor on said yoke for driving said outer gimbal about said first axis, a third pickoff device on said yoke for sensing motion of said outer gimbal relative to said yoke about said first axis, stabilizing gyroscopes mounted on and externally of said side wall portion of said element, a resolver mounted on said element and having a rotor driven by said azimuth shaft, and servo means including said resolver and responsive to said gyroscopes for driving said motors.

4. The structure of claim 3 wherein said upstanding support shaft and azimuth shaft are formed with axial bores, and including slip rings on said azimuth shaft, brushes on said element top portion cooperating with said slip rings, electrical leads connected to said slip rings and extending through the axial bores of said azimuth shaft and support shafts for connection to apparatus not carried by said stable element, said bore of the azimuth shaft being outwardly flared at the end thereof adjacent said yoke so as to permit freedom of motion of leads connected therewith, and electrical leads connecting said brushes with the gyros.

5. A stable platform comprising an elongated support having a yoke at one end thereof and adapted to be secured to a base at the other end thereof, an outer gimbal member pivoted in said yoke, an inner gimbal pivoted in said outer gimbal, a shaft fixed to said inner gimbal, a stable element including a sleeve rigidly affixed thereto and pivoted on said shaft, said stable element extending about and substantially enclosing said shaft and gimbals, a number of inertial instruments mounted on and externally of said stable element, a direct drive servo motor having a stator carried by said shaft adjacent said inner gimbal and a rotor carried by said sleeve, and second and third servo motors for driving said gimbals relative to said yoke about axes substantially normal to the axis of said shaft.

6. A stable platform comprising: an upstanding support shaft having a yoke formed at one end thereof and adapted to be secured to a base at the other end thereof; an outer gimbal ring journaled in said yoke for rotation about a first substantially horizontal axis; an inner gimbal journaled in said outer gimbal for rotation about a second substantially horizontal axis; an azimuth shaft fixed to and upstanding from said inner gimbal; a sleeve concentric with and journaled on said azimuth shaft, said sleeve extending upwardly from said inner gimbal; a stable element of substantially inverted bowl shape, said element including a support portion rigidly secured to an upper portion of said sleeve and a downwardly and outwardly extending side wall portion substantially encompassing said yoke, gimbals, azimuth shaft, and sleeve; an azimuth motor having a stator on said inner gimbal and a rotor on said sleeve for driving said element relative to said azimuth shaft; an azimuth pickoff device on said element for sensing azimuth motion of said element relative to said azimuth shaft; a second servo motor on said outer gimbal for driving said inner gimbal relative to said outer gimbal about said second axis; a second pickoff device on said outer gimbal for sensing relative motion of said gimbals about said second axis; a third servo motor on said yoke for driving said outer gimbal about said first axis; a third pickoff device on said yoke for sensing motion of said outer gimbal relative to said yoke about said first axis; stabilizing gyroscopes mounted on and externally of said side wall portion of said element; a resolver mounted on said element and having a rotor driven by said azimuth shaft; servo means including said resolver and responsive to said gyroscopes for driving said motors; a second sleeve concentric with and journaled on said upstanding support shaft; slip rings on said support shaft adapted for connection with apparatus not carried by the stable element; brushes on said second sleeve cooperating with said slip rings; electrical leads connecting the brushes to the gyroscopes; and a slip ring motor fixed to said support shaft for driving said second sleeve, said slip ring motor being connected to be driven by said azimuth pickoff device.

7. A stable platform comprising: an upstanding support shaft having a yoke formed at one end thereof and adapted to be secured to a base at the other end thereof; an outer gimbal ring journaled in said yoke for rotation about a first substantially horizontal axis; an inner gimbal journaled in said outer gimbal for rotation about a second substantially horizontal axis; an azimuth shaft fixed to and upstanding from said inner gimbal; a sleeve concentric with and journaled on said azimuth shaft, said sleeve extending upwardly from said inner gimbal; a stable element of substantially conical shape, said element including a support portion rigidly secured to an upper portion of said sleeve and a downwardly and outwardly extending sidewall portion substantially encompassing said yoke, gimbals, azimuth shaft, and sleeve; an azimuth motor having a stator on said inner gimbal and a rotor on said sleeve for driving said element relative to said azimuth shaft; an azimuth pickoff device on said element for sensing azimuth motion of said element relative to said azimuth shaft; a second servo motor on said outer gimbal for driving said inner gimbal relative to said outer gimbal about said second axis; a second pickoff device on said outer gimbal for sensing relative motion of said gimbals about said second axis; a third servo motor on said yoke for driving said outer gimbal about said first axis; a third pickoff device on said yoke for sensing motion of said outer gimbal relative to said yoke about said first axis; stabilizing gyroscopes mounted on and externally of said side wall portion of said element; a resolver mounted on said element and having a rotor driven by said azimuth shaft; servo means including said resolver and responsive to said gyroscopes for driving said motors; a second sleeve concentric with and journaled on said upstanding support shaft; slip rings on said support shaft adapted for connection with apparatus not carried by the stable element; brushes on said second sleeve cooperating with said slip rings; electrical leads connecting the brushes to the gyroscopes; and a slip ring motor fixed to said support shaft for driving said second sleeve, said slip ring motor being connected to be driven by said azimuth pickoff device.

8. A stable platform comprising: a support shaft having a yoke formed at one end thereof and adapted to be secured to a base at the other end thereof; an outer gimbal ring journaled in said yoke for rotation about a first substantially horizontal axis; an inner gimbal journaled in said outer gimbal for rotation about a second substantially horizontal axis; an azimuth shaft fixed to said inner gimbal; a sleeve concentric with and journaled on said azimuth shaft, said sleeve extending from said inner gimbal; a stable element of substantially inverted bowl shape, said element including a support portion rigidly secured to an upper portion of said sleeve and a downwardly and outwardly extending sidewall portion substantially encompassing said yoke, gimbals, azimuth shaft, and sleeve; an azimuth motor having a stator on said inner gimbal and a rotor on said sleeve for driving said element relative to said azimuth shaft; an azimuth pickoff device on said element for sensing azimuth motion of said element relative to said azimuth shaft; a second servo motor on said outer gimbal for driving said inner gimbal relative to said outer gimbal about said second axis; a second pickoff device on said outer gimbal for sensing relative motion of said gimbals about said second axis; a third servo motor on said yoke for driving said outer gimbal about said first axis; a third pickoff device on said yoke for sensing motion of said outer gimbal relative to said yoke about said first axis; stabilizing gyroscopes mounted on and externally of said side wall portion of said element; a resolver mounted on said element and having a rotor driven by said azimuth shaft; servo means including said resolver and responsive to said gyroscopes for driving said motors; a second sleeve concentric with and journaled on said support shaft; slip rings on said support shaft adapted for connection with apparatus not carried by the stable element; brushes on said second sleeve cooperating with said slip rings; electrical leads connecting the brushes to the gyroscopes; and a slip ring motor fixed to said support shaft for driving said second sleeve, said slip ring motor being connected to be driven by said azimuth pickoff device.

9. A stable platform comprising: a support shaft having a yoke formed at one end thereof and adapted to be secured to a base at the other end thereof; an outer gimbal ring journaled in said yoke for rotation about a first substantially horizontal axis; an inner gimbal journaled in said outer gimbal for rotation about a second substantially horizontal axis; an azimuth shaft fixed to said inner gimbal; a sleeve concentric with and journaled on said azimuth shaft, said sleeve extending from said inner gimbal; a stable element of substantially conical shape, said element including a support portion rigidly secured to an upper portion of said sleeve and a downwardly and outwardly extending side wall portion substantially encompassing said yoke, gimbals, azimuth shaft, and sleeve; an azimuth motor having a stator on said inner gimbal and a rotor on said sleeve for driving said element relative to said azimuth shaft; an azimuth pickoff device on said element for sensing azimuth motion of said element relative to said azimuth shaft; a second servo motor on said outer gimbal for driving said inner gimbal relative to said outer gimbal about said second axis; a second pickoff device on said outer gimbal for sensing relative motion of said gimbals about said second axis; a third servo motor on said yoke for driving said outer gimbal about said first axis; a third pickoff device on said yoke for sensing motion of said outer gimbal relative to said yoke about said first axis; stabilizing gyroscopes mounted on and externally of said side wall portion of said element; a resolver mounted on said element and having a rotor driven by said azimuth shaft; servo means including said resolver and responsive to said gyroscopes for driving said motors; a second sleeve concentric with and journaled on said support shaft; slip rings on said support shaft adapted for connection with apparatus not carried by the stable element; brushes on said second sleeve cooperating with said slip rings; electrical leads connecting the brushes to the gyroscopes; and a slip ring motor fixed to said support shaft for driving said second sleeve, said slip ring motor being connected to be driven by said azimuth pickoff device.

References Cited in the file of this patent

UNITED STATES PATENTS

| | | |
|---|---|---|
| 1,743,533 | Davis | Jan. 14, 1930 |
| 1,950,517 | Rawlings | Mar. 13, 1934 |
| 2,378,858 | Mehan | June 19, 1945 |
| 2,933,267 | Slater et al. | Apr. 19, 1960 |
| 2,936,627 | Wing et al. | May 17, 1960 |
| 2,963,242 | Mueller | Dec. 6, 1960 |
| 3,050,995 | Dozier | Aug. 28, 1962 |

OTHER REFERENCES

Machover: "Basis of Gyroscopes," vol. 2, published June 1960 by John F. Rider Publisher, Inc., 116 W. 14th St., New York 11, N.Y., 114 pages, see pages 2–78.